Nov. 13, 1962    J. T. McCREARY ET AL    3,064,244
BITE SIGNALING DEVICE
Filed Aug. 30, 1960

INVENTORS.
JAMES T. McCREARY
RICHARD E. WEBER Sr.
OLIVER VAN ZANT
BY
THEIR ATTORNEYS

United States Patent Office 3,064,244
Patented Nov. 13, 1962

3,064,244
BITE SIGNALING DEVICE
James T. McCreary, Oliver Van Zant, and Richard E. Weber, Sr., all of Miamisburg, Ohio, assignors to Oliver Van Zant, Miamisburg, Ohio
Filed Aug. 30, 1960, Ser. No. 52,830
5 Claims. (Cl. 340—213)

This invention relates to a bite signaling device and more particularly to a combination fishing rod support and bite signaling device; however, the invention is not necessarily so limited.

An object of the present invention is to provide a device adapted to support a fishing rod and capable of signaling a bite by a fish on the associated fishing line.

Another object of this invention is to provide a combination fishing rod support and bite signaling device wherein the entire rod supporting mechanism and bite signaling mechanism is assembled in a unitary housing structure.

A further object of the present invention is to provide a combination fishing rod support and bite signaling device capable of signaling either with a flashing light or a buzzer and readily disassembled for use as a conventional flashlight.

Other objects and advantages reside in the construction of parts, the combination thereof, the method of manufacture and the mode of operation, as will become more apparent from the following description.

In the drawing, FIGURE 1 is a fragmentary perspective view illustrating the bite signaling device of the present invention in association with a fishing rod shown in phantom detail.

Figure 1:
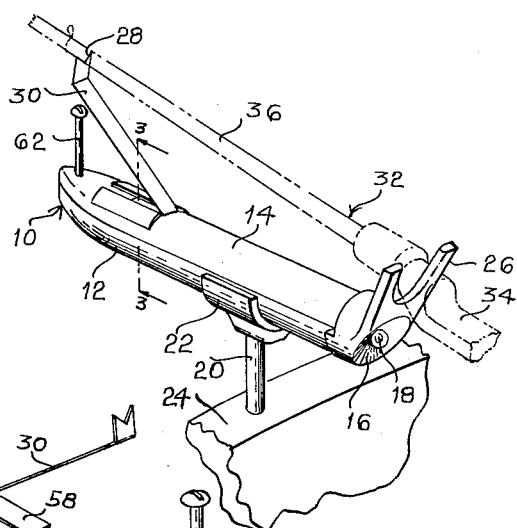

Referring to the drawing in greater detail, the bite signaling device 10, as illustrated in FIGURE 1, comprises a housing or battery casing formed of two sections, 12 and 14. The sections 12 and 14, when assembled together, form a generally bullet shaped housing.

At one end the housing section 12 is provided with a generally parabolic reflector element 16 within which is mounted a conventional flashlamp 18. The flashlamp, when energized, as described subsequently, cooperates with the reflector 16 to provide typical flashlight illumination. While not illustrated, the lamp 18 and reflector 16 may be sealed and protected with a covering lens.

Projecting upwardly and outwardly from the flashlight end of the housing section 12, is a crotch portion 26. A second crotch portion 28 is provided on the opposite end of the housing by means of a flexible metallic strap 30 inclined at an acute angle to the housing section 14 and secured thereto by means to be described subsequently. The crotch portions 26 and 28 cooperate to provide a support for a conventional fishing rod 32, the handle portion 34 for the fishing rod being cradled in the crotch portion 26 and the rod portion 36 being cradled in the crotch portion 28.

FIGURE 1 illustrates a preferred means for mounting the bite signaling device when being used on a boat. This means comprises a post 20 adapted to be fitted in a conventional oar socket of a rowboat 24 and a cradle portion 22 mounted atop the post 20. The cradle portion 22 is preferably constructed of a resilient material which misfits the housing 12, 14, so as to grip the housing when it is wedged thereinto. In the preferred mounting, the flashlight end of the housing is directed inwardly of the boat, so that illumination from the flashlight would be visible to one inside the boat. While this particular disclosure relates to use in a boat, it is to be understood that the post 20 may be used in other locations. For example, it may be driven into the ground when fishing from shore rather than from a boat.

Figure 3:
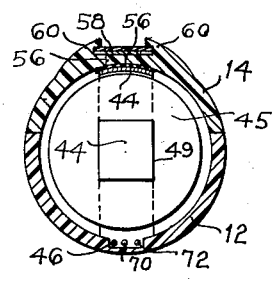
FIGURE 3 is an enlarged sectional view, taken substantially along the line 3—3 of FIGURE 1.
Figure 2:
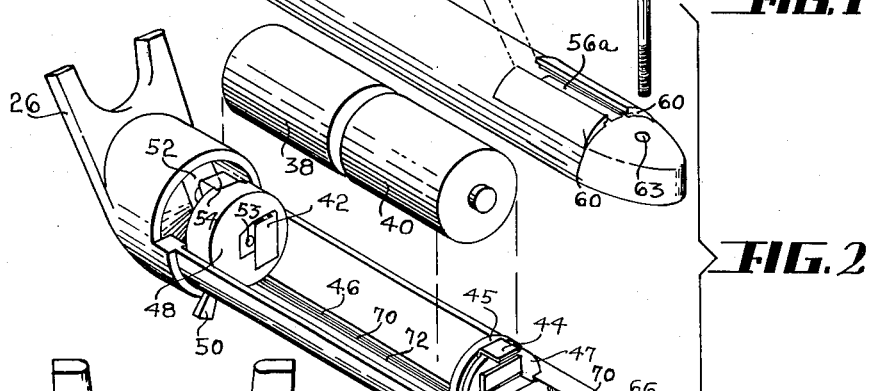
FIGURE 2 is an enlarged exploded perspective view illustrating the assembly of the bite signaling device.
Figure 4:
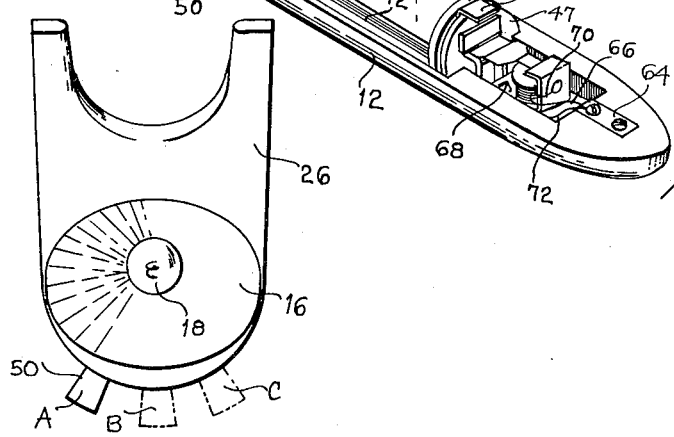
FIGURE 4 is an enlarged end view of the bite signaling device illustrating with broken line detail three positions of a selector switch employed in the present invention.

FIGURE 2 illustrates the interior construction of the bite signaling device. Mounted within the housing 12, 14 are a pair of conventional flashlight batteries 38 and 40 forming a battery pack. The terminal at one end of this battery pack engages a contact 42 mounted in the housing portion 12. The terminal at the opposite end engages a contact 44 supported between insulating discs 45 and 47 in the housing section 12. As best illustrated in FIGURE 3, the disc 45 has a window 49 therein affording access to the contact 44. A conductor 46 extends from the contact 44 to a three position switch 48 having a selector 50. The selector 50 has one position, indicated by the reference character A in FIGURE 4, establishing contact between the conductor 46 and a contact 52 mounted in the flashlight end of the housing section 12, so as to establish contact with one terminal of the flashlamp 18. The second terminal of the flashlamp 18 engages a contact 54 connected electrically to the contact 42 by means of a rivet 53 passing through the housing for the switch mechanism 48. In view of the aforesaid construction, it will be apparent that when the selector 50 is in position to establish contact between the conductor 46 and the contact 52, the flashlamp 18 will be energized in the manner of an ordinary flashlight.

As illustrated in FIGURES 2 and 3, the contact 44 is exposed at an upper position in the housing section 12, the contact having a general L-shaped configuration. The position of this contact 44 is such that when the housing section 14 is assembled with the housing section 12, electrical connection is made with a contact 56 mounted on the housing section 14. This contact 56 has a portion 56a projecting through the housing section 14 and overlying the exterior surface thereof. This portion 56a establishes electrical contact with a leg 58 of the strap 30. This leg 58 is slidably received between a pair of projections 60 in the upper surface of the housing section 14. These projections 60 cooperate to support the leg 58 in intimate engagement with the contact 56a. Thus, in the assembled device, the strap 30 is electrically connected to one terminal of the battery pack.

Mounted in spaced relation to the strap 30 at the adjacent end of the housing 12, 14 is an electrical contact 62 which is in the form of a conventional screw. This contact passes through a hole 63 in the housing section 14 to threadedly engage an electrical contact 64 fixedly mounted in the housing section 12. Extending from the contact 64 is a conductor 66 leading to one terminal of a coil for a conventional buzzer mechanism indicated by the reference numeral 68. The other terminal of the coil is connected to a conductor 70 leading along the bottom of the housing section 12 to the switch 48. The selector 50 of the switch has a second position, indicated by the reference character B in FIGURE 4, establishing electrical connection between the conductor 70 and the contact 42 engaging the battery pack. In view of this construction, it is apparent that with the selector 50 in position B, and with the strap 30 engaging the adjacent contact 62, the buzzer 68 will be energized. Thus, the buzzer 68 audibly indicates the fact that the strap 30 is engaged by the contact 62.

A second conductor 72 extends from the contact 64 along the bottom of the housing section 12 to the switch 48. The switch selector 50 has a third position, indicated by the reference character C in FIGURE 4, establishing electrical connection between the conductor 72 and the contact 52 associated with the flashlamp. Thus, depending upon the position of the selector 50, the establishment of contact between the strap 30 and the adjacent contact 62 will result in an audible signal from the buzzer 68 or in a visible signal from the flashlamp 18.

With reference to FIGURE 1, it will be observed that the strap 30 supports the rod portion of the fishing rod. Since the strap 30 is flexible, it will yield some under the weight of the fishing rod, the strap approaching the adjacent contact 62 as it yields. The contact 62, being a screw, is adjustable upwardly and downwardly relative to the strap 30. When positioned in close proximity to the strap 30, a very slight load in addition to that of the fishing rod will establish electrical contact. As the contact 62 is adjusted downwardly, the additional load required to cause the strap 30 to touch the contact increases. Thus, the sensitivity of the bite signaling device is adjustable.

It will be apparent, of course, that with proper adjustment of the sensitivity of the bite signaling device, the nibbling of a fish on the line can be detected. Furthermore, with a different adjustment in the sensitivity of the device, it is possible to delay the signal until a fish has actually been caught and pulls on the line.

As described, the switch selector 50 has three positions; one for giving an audible signal in the event of a bite, one for giving a visible signal in the event of a bite, and a third for energizing the lamp 18 as a conventional flashlamp. When fishing at night, there is frequent need for flashlight illumination. Sometimes this need can be satisfied with the bite signaling device mounted as illustrated in FIGURE 1. At other times, portable illumination is needed. In such event, the bite signaling device may be lifted out of the cradle 22, the strap 30 slid out of its retaining projections 60 and the screw-type contact 62 removed. After this is done, the bite signaling device has substantially the characteristics of an ordinary flashlight and may be used as such.

Preferably, the housing sections 12 and 14 are constructed of an insulating material, as this simplifies the construction of the electrical components of the bite signaling device. As one example, the housing sections 12 and 14 may be molded from a plastic material. It should be understood, of course, that metallic housing sections may be used, provided the electrical components of the bite signaling device are insulated in the conventional manner.

Although the preferred embodiment of the device has been described, it will be understood that within the purview of this invention various changes may be made in the form, details, proportion and arrangement of parts, the combination theerof and mode of operation, which generally stated consist in a device capable of carrying out the objects set forth, as disclosed and defined in the appended claims.

Having thus described our invention, we claim:

1. A combination fishing rod support and bite signaling device comprising an elongate battery case, a first crotch portion projecting upwardly from said case adjacent the rearward end thereof, an electrically conducting contact element projecting upwardly from said case adjacent the forward end thereof, a resilient electrically conducting element anchored to said battery case intermediate said contact element and said crotch portion and extending forwardly of said case at an acute angle with the axis thereof to a point substantially overlying, but normally spaced from said contact element, said resilient element terminating at its outer end in a second crotch portion, said first and second crotch portions cooperating to provide a cradle for a fishing rod extending forwardly of said case, said resilient element having sufficient strength to resist touching said contact element under the weight of the fishing rod but yielding to touch said second contact element when said rod receives a downward pull, as from a fish biting on a line secured by the rod, battery means and a signal device operable thereby mounted in said case, and conductor means connecting the battery means, the contact element, the resilient element and the signal device in series relation whereby the signal device is energized by said battery means upon said resilient element touching said contact element.

2. The combination according to claim 1, wherein said upwardly projecting contact element is adjustable vertically to vary the proximity of the contact element to the strap.

3. A combination fishing rod support and bite signaling device adaptable for separate use as a portable flashlight comprising an elongate battery case, a first crotch portion projecting upwardly from said case adjacent the rearward end thereof, a detachably mounted electrically conducting contact element projecting upwardly from said case adjacent the forward end thereof, a resilient electrically conducting strap detachably anchored to said battery case intermediate said contact element and said crotch portion and extending forwardly of said case at an acute angle with the axis thereof to a point substantially overlying, but normally spaced from said contact element, said strap terminating at its outer end in a second crotch portion, said first and second crotch portions cooperating to provide a cradle for a fishing rod extending forwardly of said case, said strap having sufficient strength to resist touching said contact element under the weight of the fishing rod but yielding to touch said contact element when said rod receives a downward pull, as from a fish biting on a line secured by the rod, battery means together with a flashlamp operable thereby and a selector switch mounted in said case, and conductor means connecting the battery means, the contact element, the strap, the flashlamp, and the selector switch in series relation, the selector switch having one position for energizing said flashlamp upon the strap touching the contact element and having a second position by-passing contact element and said strap to energize said flashlamp independently thereof.

4. The combination according to claim 3 including an audible signal device mounted in the battery case, and conductor means connecting said audible signal device in series relation with said switch, said strap, said electrical contact element, and said battery means, said selector switch having a third position energizing said audible signal means on said strap touching said contact element.

5. The combination according to claim 3, wherein said battery case includes a contact portion overlying the exterior surface thereof and includes a pair of projections flanking said overlying contact for slidably receiving said strap and supporting said strap in intimate engagement with said overlying contact, said overlying contact establishing electrical connection between said strap and said battery means, the construction and arrangement being such that said strap may be detached from said battery casing by sliding same out from between said projections.

References Cited in the file of this patent

UNITED STATES PATENTS

| | | |
|---|---|---|
| 2,331,665 | Douglas et al. | Oct. 15, 1943 |
| 2,481,881 | Schneider | Sept. 13, 1949 |
| 2,567,777 | Massino | Sept. 11, 1951 |
| 2,745,088 | Bover | May 8, 1956 |
| 2,772,407 | Nichols | Nov. 27, 1956 |
| 2,814,900 | Frazier | Dec. 3, 1957 |